United States Patent [19]

Pierce

[11] Patent Number: 5,167,593
[45] Date of Patent: Dec. 1, 1992

[54] NONSYNCHRONOUS FOUR-SPEED TRANSAXLE FOR AUTOMOTIVE VEHICLES

[75] Inventor: Stanley L. Pierce, Northville, Mich.

[73] Assignee: Ford Motor Company, Dearborn, Mich.

[21] Appl. No.: 739,641

[22] Filed: Aug. 2, 1991

[51] Int. Cl.[5] .................. F16H 57/10; F16H 3/62
[52] U.S. Cl. ........................ 475/281; 475/276; 475/59
[58] Field of Search ............. 475/59, 66, 71, 271, 475/275, 276, 281, 282, 283, 290, 291, 292

[56] References Cited

U.S. PATENT DOCUMENTS

| 3,799,004 | 3/1974 | Hause | 475/281 |
|---|---|---|---|
| 4,086,827 | 5/1978 | Chana | 475/281 |
| 4,368,649 | 1/1983 | Vahratian et al. | 475/66 |
| 4,418,585 | 12/1983 | Pierce | 475/66 |
| 4,452,099 | 6/1984 | Croswhite | 475/66 |
| 4,509,389 | 4/1985 | Vahratian et al. | 475/71 X |
| 4,841,804 | 6/1989 | Miura et al. | 475/71 X |
| 4,978,328 | 12/1990 | Pierce | 475/66 |

FOREIGN PATENT DOCUMENTS 376210 7/1990 European Pat. Off. ............ 475/59

Primary Examiner—Leslie A. Braun
Assistant Examiner—Khoi Q. Ta
Attorney, Agent, or Firm—Frank G. McKenzie; Roger L. May

[57] ABSTRACT

A transaxle for use in an automotive vehicle driveline includes a torque converter and a compound planetary gear system having two simple planetary gear units adapted to provide four forward driving torque delivery paths, the highest speed ratio path being an overdrive, the axis of the torque converter being located on the crankshaft axis of the vehicle engine, and a torque output shaft being parallel to the torque converter and engine axis. Hydraulically actuated friction clutches and brakes and one-way couplings interconnect the input and output of the transmission to members of the planetary gearset and the transmission casing. A final drive planetary gearset, driven by the output of the planetary gear units, drives a differential mechanism connected to the axle shaft of the vehicle.

12 Claims, 5 Drawing Sheets

| GEAR | CC | 4B | DC | RC | FC | 2B | L/R | DRIVE ||| COAST |||
|---|---|---|---|---|---|---|---|---|---|---|---|---|---|
| | | | | | | | | OWC3 | OWC2 | OWC1 | OWC3 | OWC2 | OWC1 |
| 1M | X | | | | X | | X | X | X | | | | |
| 1 | | | | | X | | | X | X | | | O/R | O/R |
| 2M | X | X | | | X | X | | X | X | O/R | | | O/R |
| 2 | | | | | X | X | | X | X | O/R | O/R | O/R | O/R |
| 3M | X | | X | | X | X | | O/R | X | O/R | O/R | | O/R |
| 3 | | | X | | X | X | | O/R | X | O/R | O/R | O/R | O/R |
| 4 | | X | X | | X | X | | | O/R | O/R | X | O/R | O/R |
| R | | | | X | | X | X | | | O/R | | | | ns between an input friction clutch and a gear member of a planetary gear set. The one-way clutch permits the gear member to overrun the input during an overdrive ratio so that an upshift from the third speed to the fourth speed results without a synchronous release of the input friction clutch. To produce a downshift from the fourth speed to the second or third speeds, the input increases to the speed of the gear member by engagement of the one-way clutch when a friction brake or another friction clutch is released.

NONSYNCHRONOUS FOUR-SPEED TRANSAXLE FOR AUTOMOTIVE VEHICLES

BACKGROUND OF THE INVENTION

1. Field of the Invention

This invention relates to planetary gearing, clutches and brakes for an automatic transmission used in motor vehicles. The invention pertains, more particularly, to a transaxle having two planetary gear units that produce an overdrive speed, direct drive, and two underdrive speeds.

2. Description of the Prior Art

Various arrangements of clutches, brakes and one-way clutches are used in the prior art to control operation of dual interconnected planetary gear units to produce forward speed ratios and a reverse drive ratio in an automatic transmission.

U.S. Pat. No. 4,418,585 has clutches and brakes arranged so that a gear ratio change from the lowest speed to the second speed is made nonsynchronously, i.e., by transferring torque from an overrunning coupling to a friction clutch. In that transmission, a gear shift from the second speed to the third speed requires disengagement of the brake band and application of a clutch. A gear ratio change from the third speed to the fourth or overdrive speed also requires disengagement of a brake band and engagement of a friction clutch. In the operation of the transmission, none of the gear shifts require synchronous disengagement of a clutch and engagement of another clutch. Therefore, timing problems the engagement and release of the clutch brake control servos are eliminated.

The transmission according to the '585 patent requires time for disengagement of a high speed ratio clutch and application of a friction brake in order to produce the ratio change from the third forward speed to the fourth overdrive speed.

U.S. Pat. No. 4,368,649 describes a four-speed transaxle that overcomes this difficulty. In the transaxle of the '649 patent the gear shift from the third speed to the fourth speed results by applying a single friction brake in addition to the other friction elements engaged during the third speed ratio. A gear shift from the first speed to the second forward speed results merely by engaging a second friction clutch while a companion friction clutch remains applied. In this way, a ratio change from the first ratio and from the third ratio in the forward driving speed range results merely by engaging or disengaging a single friction element, either a clutch or a brake, thereby greatly simplifying control of the clutches and eliminating potential for harsh or abrupt gear shift changes.

U.S. Pat. No. 4,509,389 describes a further improvement that eliminates a latent difficulty in control of the transmission of the '649 patent that makes calibration of the two-three upshift difficult. The sun gear is not connected to a friction clutch cylinder but is connected instead to the inner race of an associated one-way clutch. The inner races of each one-way coupling are connected to a common member, which operates as a torque delivery element for the input sun gear of the planetary gear. The maximum speed of the friction clutch cylinders is equal to the speed of the driven sprocket of a chain mechanism connecting the output of a torque converter to the input shaft of the transmission.

U.S. Pat. No. 4,086,827 describes a four speed transmission in which a single one-way clutch is located in series between an input friction clutch and a gear member of a planetary gear set. The one-way clutch permits the gear member to overrun the input during an overdrive ratio so that an upshift from the third speed to the fourth speed results without a synchronous release of the input friction clutch. To produce a downshift from the fourth speed to the second or third speeds, the input increases to the speed of the gear member by engagement of the one-way clutch when a friction brake or another friction clutch is released.

SUMMARY OF THE INVENTION

My invention is a two-axis transaxle having a hydrokinetic torque converter mounted on an axis concentric with the engine crankshaft and parallel to the axis of the multiple speed gearing. The transaxle produces two underspeed ratios, a direct drive ratio and an overspeed.

The automatic transaxle of this invention produces four forward speed ranges and a reverse drive. Because of the unique arrangement of the clutch, brakes and one-way couplings, the transaxle is extremely compact and its weight is low. The compactness of the transaxle is the result of use of certain components of the transaxle for multiple purposes to produce multiple speed ratios. For example, the structure that provides the gearset reaction force through a one-way coupling in the intermediate speed range, the second speed ratio, is used also to transmit torque converter turbine torque in the reverse drive condition.

The torsional path between the engine and the planetary gear in the reverse drive condition is through a reverse friction clutch and a cylinder or drum that provides a surface engaged by an intermediate brake band and the friction plate of the reverse friction clutch. This use of the shell or drum for multiple purposes eliminates the need for an additional component.

A one-way coupling, located between the gear units and engine, overruns in the reverse coast condition. The engine is drivably disconnected from the wheels and therefore unavailable to impede vehicle movement. This avoids abrupt unexpected changes in acceleration when the operator changes from drive to coast conditions in the reverse range.

The transmission includes two planetary gear units each including a sun gear, a ring gear, carriers and planetary pinions rotatably supported on the carriers and meshing with the sun gear and ring gear. The carrier of the second carrier unit is fixed to the ring gear of the first gear unit and is drivably connected as the output from the gear to the sun gear of a final drive planetary gear set that drives a differential mechanism. Parallel torque delivery paths between the ring gear of the second planetary gear set and a low reverse brake drum comprise a one-way coupling and a forward clutch in parallel with a coast clutch, which provides a torque reaction that bypasses the one-way clutch during a coast condition.

The clutches and brakes of the transaxle are arranged so that the gear ratio change from the lowest speed to the second speed results by transferring torque from a one-way brake to a intermediate brake band. A gear ratio change from the second speed to the third speed results when a direct clutch is engaged and while the brake band continues to be applied. A gear ratio change from the third speed to the fourth speed results by applying an overdrive brake, a friction member, while maintaining engagement of the direct clutch. Therefore, no ratio change requires synchronous disengagement of a friction element and application of another friction element. Because of this feature, timing problems in the engagement and release of friction clutches and brakes and control servos are eliminated.

DESCRIPTION OF THE PREFERRED EMBODIMENT

Figures 1, 2:
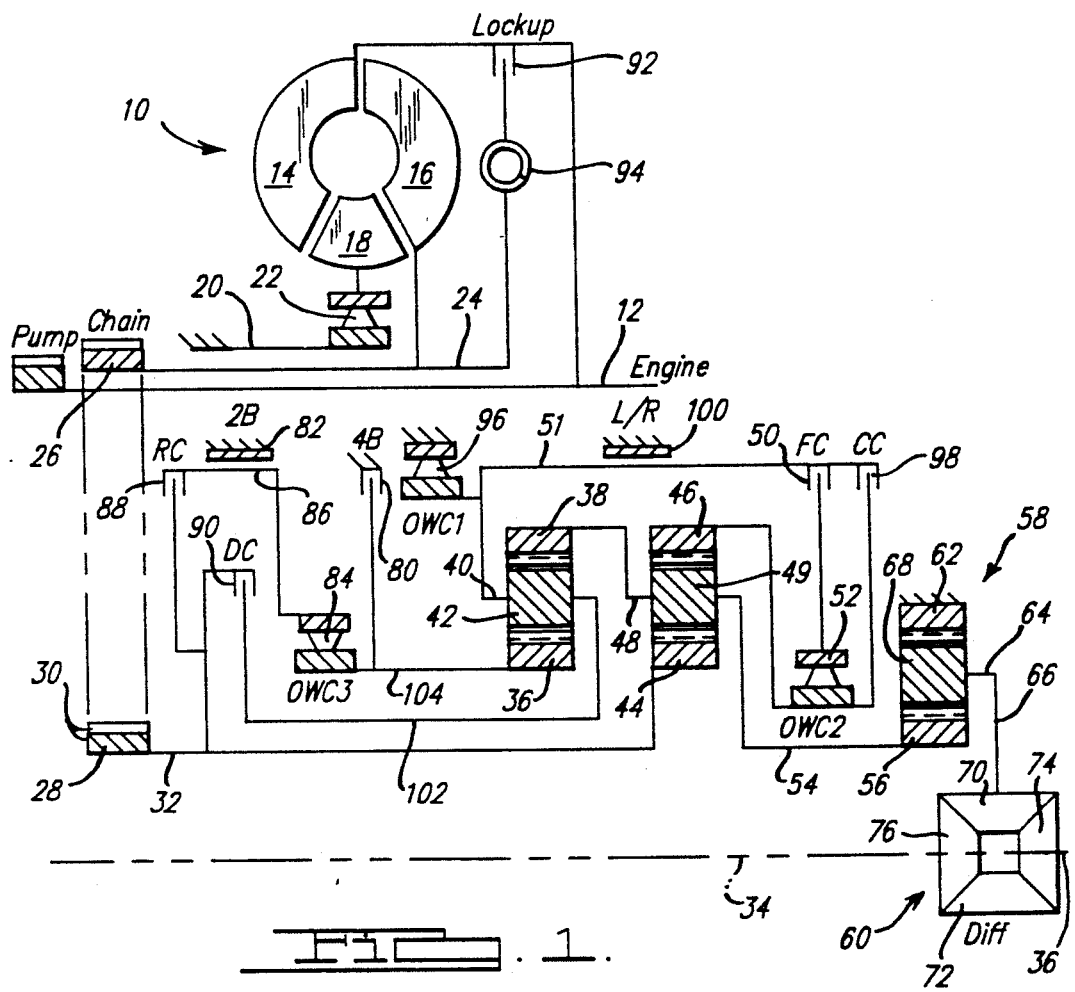
FIG. 1 is a schematic diagram showing planetary gearing, clutches, brakes, a torque converter, input and output torque delivery paths in a transaxle according to this invention.
FIG. 2 is a chart that shows a schedule of engagement and release of clutches, couplings and brakes to establish the forward drive ratios and reverse drive of the transaxle of FIG. 1.

Referring first to FIG. 1, a hydrokinetic torque converter 10 is drivably connected to an internal combustion engine having a crankshaft 12 connected to a bladed impeller 14 of the torque converter. A bladed turbine 16, a bladed stator 20, and the impeller 14 define a toroidal fluid flow circuit within the casing of the torque converter. The stator 18 is supported on a stationary sleeve shaft 20, and a overrunning brake 22 anchors the stator to shaft 20 to prevent rotation of stator 18 in a direction opposite to the direction of rotation of the impeller, although free-wheeling motion in the opposite direction is permitted.

Turbine 16 is connected to turbine sleeve shaft 24, which drives the torque input sprocket wheel 26. Sprocket wheel 26 is part of an input torque transfer drive that includes also drive chain 28 and driven sprocket wheel 30, which is mounted for rotation about the torque input sleeve shaft 32. Axle shafts 34, 36 are concentric with the axis of input shaft 32.

Planetary gear includes two simple planetary gear units comprising a first gear unit having a sun gear 36, ring gear 38, carrier 40 and planetary pinions 42, supported by carrier 40 in meshing engagement with sun gear 36 and ring gear 38. A second planetary gear unit includes a sun gear 44, a ring gear 46, carrier 48 and planet pinions 50, supported by carrier 48 in meshing engagement with sun gear 44 and ring gear 46. Carrier 40 is connected to ring gear 46 by a drum 51, forward clutch 50 and a one-way coupling 52, also identified as OWC2. Ring gear 38 is connected to carrier 48 and to torque output shaft 54.

A final drive planetary gearset 58 is located in a torque delivery path between output shaft 54 and a differential gear unit 60, to which axle shafts 34 and 36 are connected. Gearset unit 58 includes sun gear 56, connected to output shaft 54; ring gear 62, permanently fixed to the transmission casing; a carrier 64, connected to the spindle 66 of the differential mechanism 60; and planet pinions 68, rotatably supported on carrier 64 in engagement with sun gear 56 and ring gear 58. Differential gear unit 60 has bevel pinions 70, 72, which mesh with bevel side gears 74, 76, connected respectively to axle shafts 36, 34.

Sprocket wheel 30, connected to sleeve shaft 32, is connected directly to sun gear 44 of the second planetary gear unit. The sun gear 36 of the first gear unit is directly connected to the transmission casing through a brake 80, which carries also the symbol for 4B and by a brake 82, which also carries the symbol 2B. The inner race of a one-way coupling 84 (OWC3) is directly connected to sun gear 36; the outer race of the coupling 84 is connected to the drum 86, which is connected to the transmission casing through operation of brake 82. The outer torsional member of reverse clutch 88 (RC) is connected to drum 86, and the inner member of the reverse clutch is directly connected to input shaft 32 and to the outer member of direct clutch 90 (DC). Carrier 40 of the first gear unit is selectively connected to the input shaft 32 through direct clutch 90.

The torque converter includes a lockup clutch 92, located within the torque converter and impeller housing. The torque output side of the lockup clutch has a damper 94 located between the impeller and the turbine sleeve shaft 24 so that engagement of the lockup clutch will not be accompanied by harshness to transitional torque fluctuations.

The inner race of a one-way or overrunning brake (OWC1) 96 is directly connected to carrier 40 and drum 51; the outer race of brake 96 is fixed permanently against rotation to the transmission casing. The inner race of one-way clutch 52 is connected to ring gear 46, and the outer race is connected to one element of forward clutch 50. One-way couplings 52, 84 and one-way brake 96 are roller-type overrunning couplings generally having an outer cam with an inclined surface drivably connected to, and released from the inner race by a roller in accordance with the speed of rotation of the inner race relative to the outer race.

The inner race of one-way coupling 52 is also connected to an element of coast clutch 98 (CC), the other component of the coast clutch being connected to drum 51.

Friction elements 50, 80, 88, 90, 98 are hydraulically actuated clutches and brakes of the type having multiple friction discs supportably rotated on one member of the friction element and a second set of friction discs interposed between the members of the first friction disc set and supported rotatably on the other member of the friction element. When hydraulic pressure is applied to the friction element, the discs are brought into mutual frictional contact and the friction element transmits torque between its members. When the magnitude of hydraulic pressure supplied to the friction elements is reduced, a spring disengages the discs and the friction element is thereafter unable to transmit torque.

A low/reverse brake band 100 selectively engages drum 52 in low speed manual and reverse drive conditions. Brake bands 82 are actuated by an hydraulic servo, which when activated contract the brake band into engagement with the respective drums 51, 86 and release this engagement when hydraulically actuated servos are vented.

FIG. 2 shows a chart indicating the clutches and brakes that are engaged and release selectively to produce each of the various forward drive ratios and the reverse ratio. In the chart, the symbol X is used to identify an engaged clutch or brake, the symbol O/R is used to designate an overrunning condition for couplings or brakes 52, 84, 96, and a blank is used with respect to columns entitled "OWC1", "OWC2" and "OWC3" to indicate a one-way coupling or brake that is neither overrunning nor driving.

Figure 3:
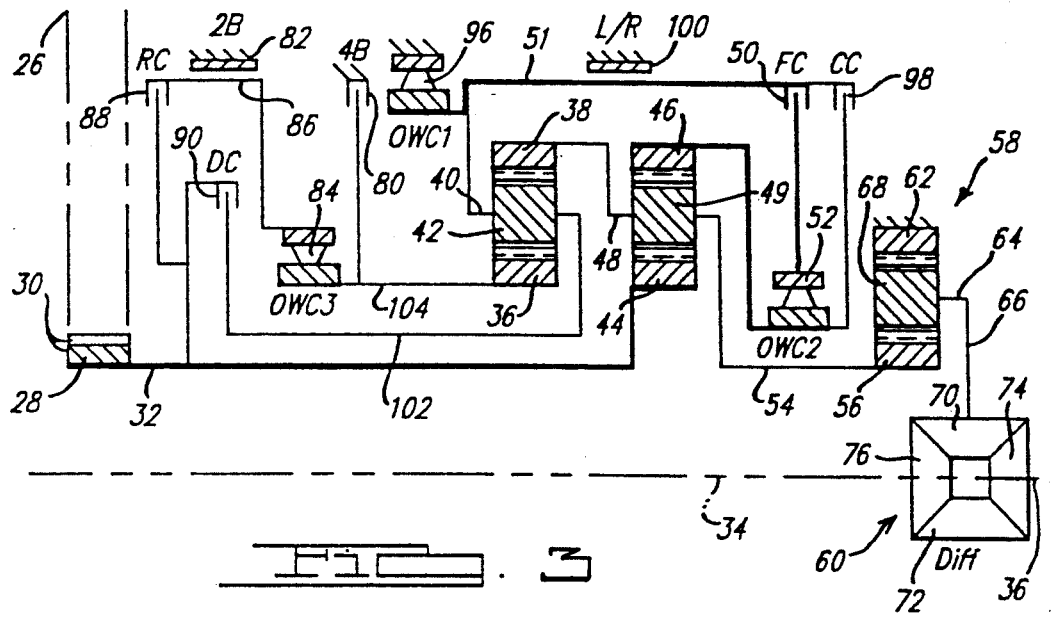
FIGS. 3 and 4 are schematic diagrams highlighting the torque delivery paths for automatically selected low speed and manually selected low speed, respectively.

In operation, to establish automatically the lowest forward speed ratio, forward clutch 50 is applied, one-way clutch 52 drives and one-way brake 96 drives. The torque delivery path for first speed in the D-range is indicated in heavy lines in FIG. 3. When the forward clutch is engaged, ring gear 46 is fixed to the transmission casing against rotation, thereby providing the gearset reaction. Engine torque then is transmitted hydrodynamically through the torque converter, and transfer drive chain 28 to sprocket wheel 30, input shaft 32, and sun gear 44. Carrier 48 of the second planetary gear unit drives output shaft 54, and the axle shafts 34, 36 are driven through the final drive gear set 58 and the differential unit 60. When operating in the D-range under a coast condition, one-way brake 96 and one-way clutch 52 overrun.

Figure 4:
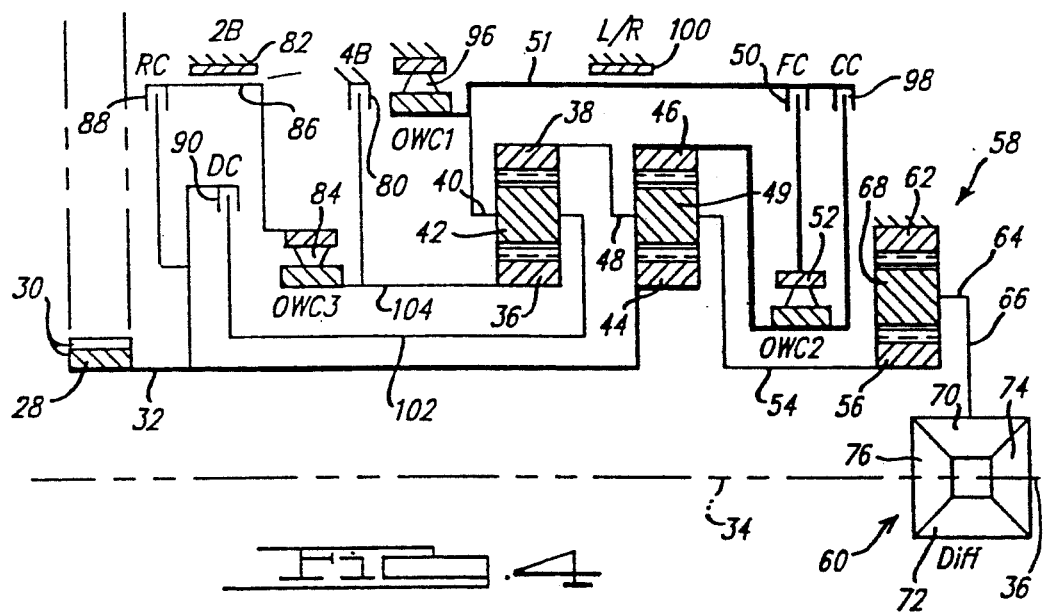

Referring to FIG. 4, when first gear is selected manually by the operator placing the gear shift lever in the 1M range position, coast clutch 98 and low reverse band 100 are applied. The torque delivery path from ring gear 46 through the coast clutch shunts the path through one-way coupling 52 and the forward clutch. Therefore, in the drive condition, there are two parallel paths potentially providing a gearset reaction on the transmission casing that holds ring gear 46 against rotation. One path is through one-way coupling 52 and forward clutch 50, and one-way brake 96; the other path is through coast clutch 98 and reverse band 100. However, in the coast condition, couplings 52 and 96 are inoperative, and the reaction on the transmission casing that holds ring gear 46 is provided through the coast clutch and the low/reverse band.

Figure 5:
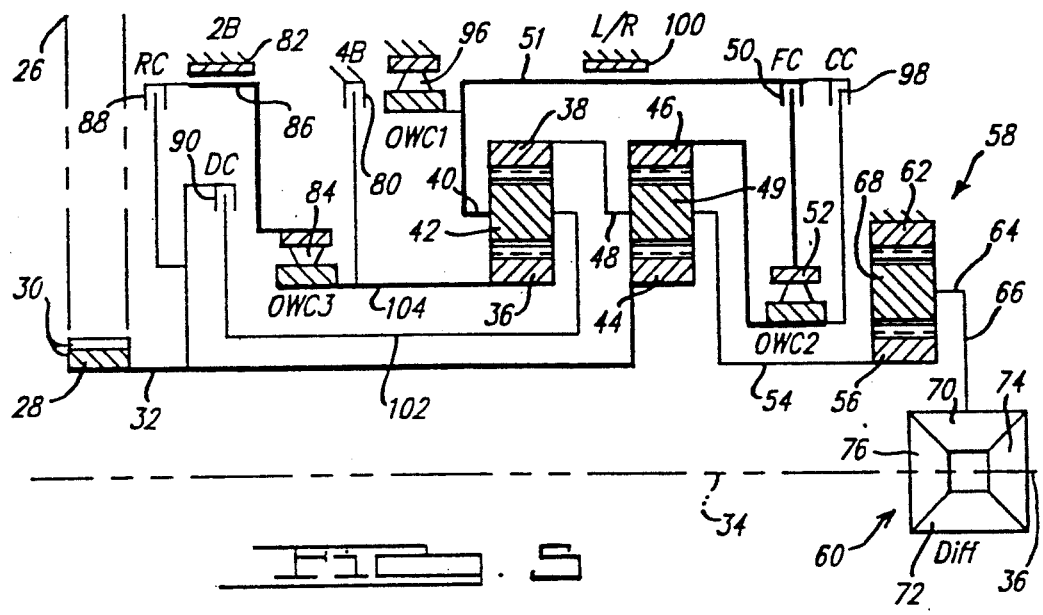
FIGS. 5 and 6 are schematic diagrams highlighting the torque delivery paths for automatically selected second speed and manually selected second speed, respectively.

FIG. 5 shows the torque delivery path for the second forward speed in the D-range. Forward clutch 50 and brake band 82 are applied, one-way couplings 52, 84 drive, and one-way brake 96 overruns. In this instance, sun gear 36 is held against rotation on the transmission casing by engagement of brake band 82. Torque from the engine is delivered to sun gear 44 and the output is taken at carrier 48, which is connected to output shaft 54. In the coast condition, all the one-way couplings overrun; therefore, the output means comprising output shaft 54, carrier 48 and planet pinions 49 turn as a unit.

Figure 6:
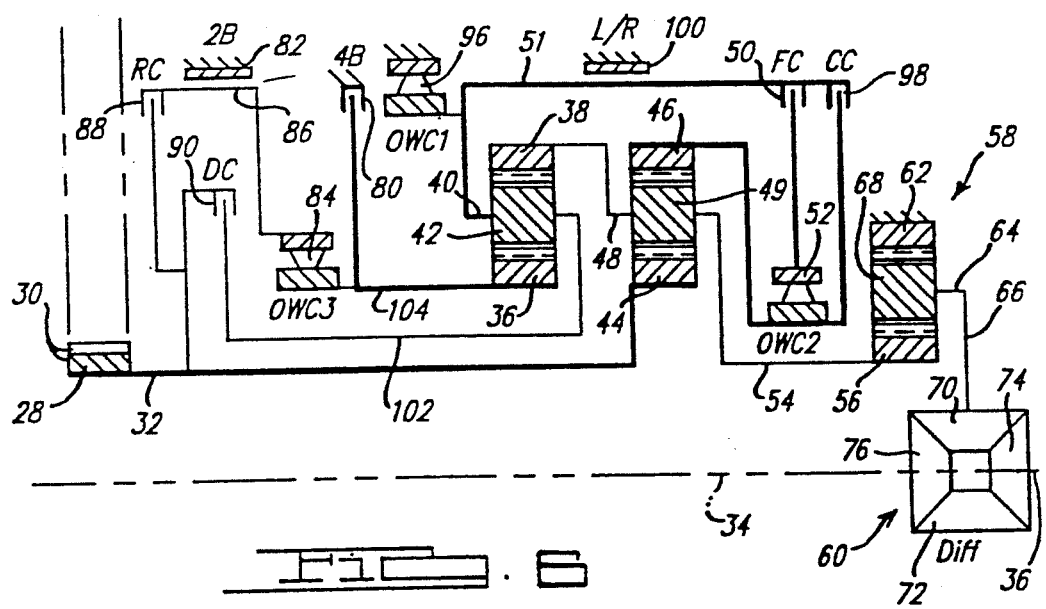

When the gear selector is set manually for operation in the 2M range, coast clutch 98, forward clutch 50, friction brake 80 and brake band 82 are applied. FIG. 6 highlights the torque delivery path for the 2M range. During the drive condition in the 2M range, one-way couplings 52, 84 drive and one-way brake 96 overruns. In this instance, sun gear 36 is fixed against rotation on the transmission housing by engagement of the brake band 82, and ring gear 46 is drivably connected to carrier 40 of the first planetary gear unit through either the torque delivery path that includes coast clutch 98 or the parallel path that includes one-way coupling 52 and forward clutch 50. In the coast condition in the 2M range, one-way brake 96 overruns and one-way couplings 52 and 84 are inoperative. Sun gear 36 is fixed to the transmission casing against rotation by brake 80. Ring gear 46 is connected to carrier 40 of the first planetary gear unit through the path that includes coast clutch 98 and drum 51. Sun gear 44 drives input shaft 32.

Figure 7:
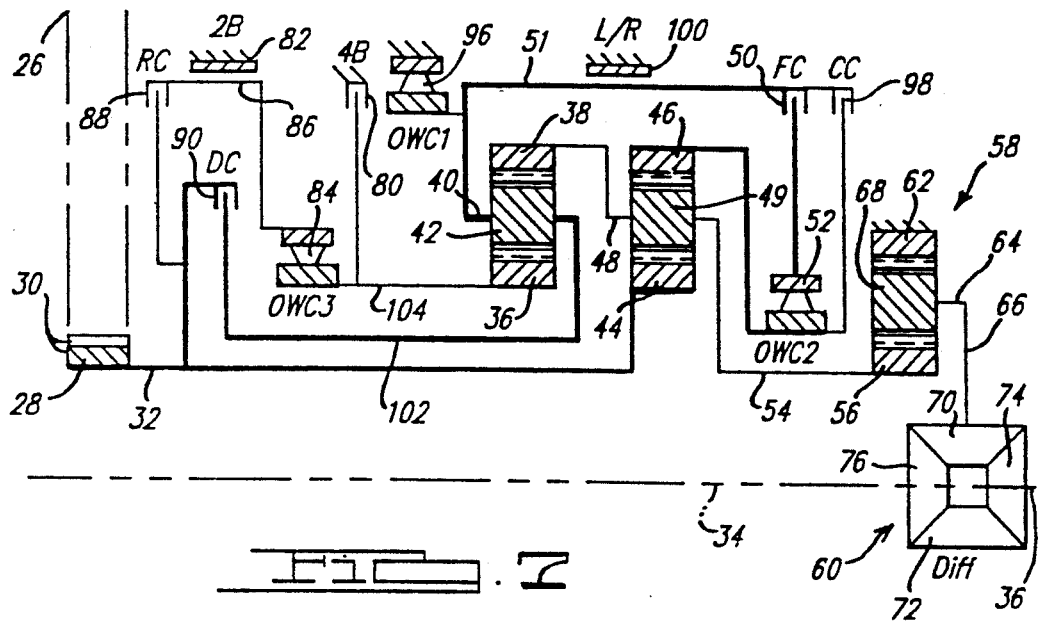
FIGS. 7 and 8 are schematic diagrams highlighting the torque delivery paths for automatically selected third speed and manually selected third speed, respectively.

FIG. 7 shows the torque delivery path when the transmission operates in the third forward speed and the gear selector is in the D-range, where gearshifts are produced automatically. In this case, forward clutch 50 and brake band 82 remain engaged, direct clutch 90 is engaged and one-way coupling 52 drives. Torque input from the engine is through the direct clutch and intermediate shaft 102, arranged concentrically with input shaft 32 and axle shaft 34, to carrier 40 of the first planetary gear unit. Carrier 40 drives ring gear 46 through drum 51, forward clutch 50 and one-way coupling 52. The torque output is taken by carrier 48 to output shaft 54.

During a coast condition in the third forward speed range, all of the one-way couplings overrun and torque from output shaft 54 is transmitted through carrier 40 to ring gear 38. Ring gear 46 is drivably connected by overrunning coupling 52 from input shaft 32.

Figure 8:
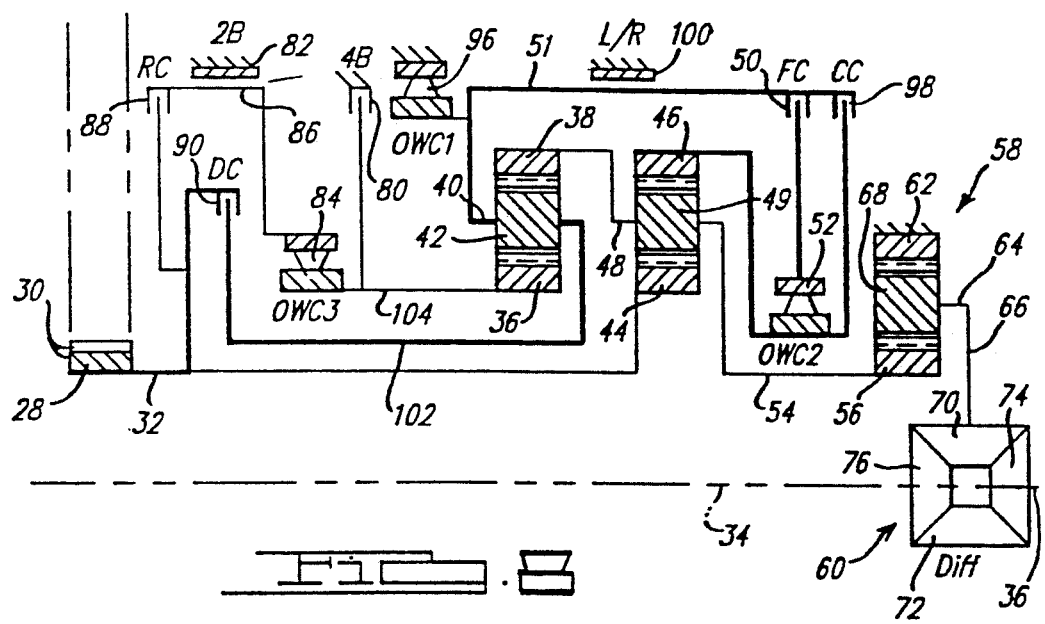

FIG. 8 shows the torque delivery paths with the transmission operating in the 3M range. In that range, forward clutch 50, coast clutch 98, direct clutch 90 and brake band 82 are applied. During a drive condition in that range, one-way coupling 52 drives. With the friction elements so engaged, the engine shaft 12 is drivably connected through the torque converter and chain drive to the input shaft 32, which is connected through direct clutch 90 to intermediate shaft 102, which drives carrier 40, the input member of the first planetary gear unit. Carrier 40 is connected through friction clutch 50 and one-way clutch 52 to ring gear 46. The third speed ratio is a direct drive ratio; therefore, the output unit, ring gear 38, carrier 48 and output shaft 54, turn at the speed of carrier 40 and ring gear 46. During a coast condition in the 3M range, one-way coupling 52 is inoperative. Therefore, coast clutch 98 and drum 51 bypass the torque delivery path that includes forward clutch 50 and one-way coupling 52 to drivably connect ring gear 46 to carrier 40, thereby driving input shaft 32 at the speed of output shaft 54. Engagement of brake 82 assures that one-way coupling 84 overruns.

Figure 9:
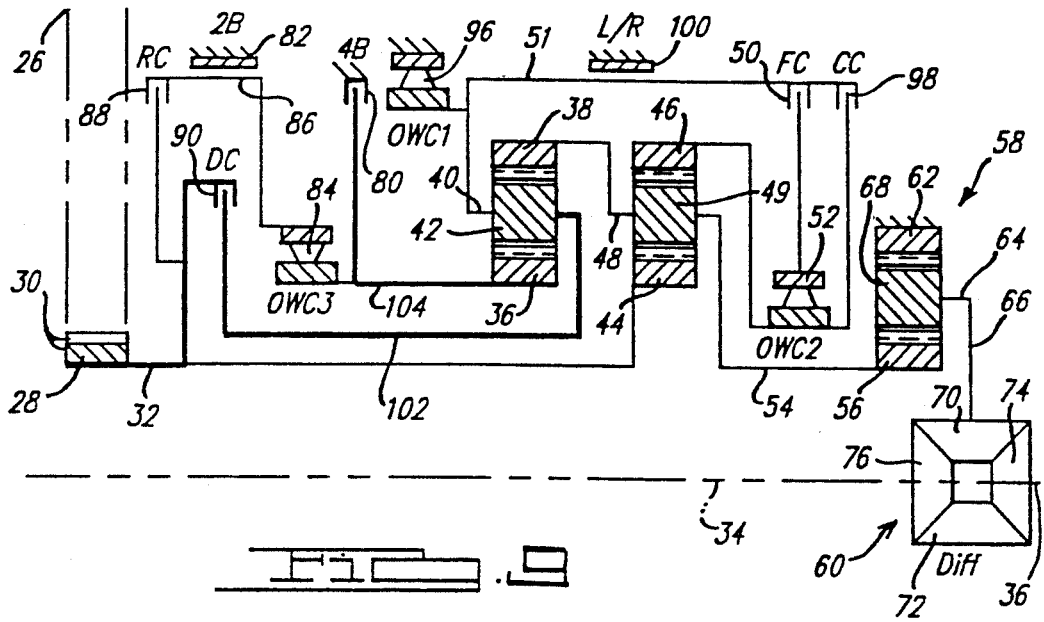
FIGS. 9 and 10 show schematically the torque delivery paths for the high forward speed ratio and reverse drive, respectively.

FIG. 9 shows the torque delivery paths for operation in the fourth forward speed, an overdrive ratio, available only when the gear selector is in the D range position. To produce the high speed ratio, brake bands 80 and 82, forward clutch 50 and direct clutch 90 are applied, one-way couplings 52 and 96 overrun, and one-way coupling 84 is inoperative. Consequently, the engine shaft is connected through the torque converter, chain drive mechanism, input shaft 32, direct clutch 90 and intermediate shaft 102 to carrier 40, the input of the planetary gear. Sun gear 36 is fixed against rotation on the transmission housing by engagement of friction brake 80. The output is ring gear 38, carrier 48 and output shaft 54, whose speed of rotation is multiplied through this arrangement in the first planetary gear unit only. The second gear unit is inoperative, although forward clutch 50 is engaged, because one-way coupling 52 overruns. Engagement of brake band 82 assures that one-way coupling 84 overruns in the drive condition.

During the coast condition in fourth speed, one-way coupling 84 drivably connects sun gear 36 to the transmission casing due to engagement of brake band 82. One-way couplings 52 and 96 overrun. Consequently, output shaft 54 drives ring gear 38 through carrier 48.

Carrier 40 is drivably connected to the sprocket wheel 30 of the chain drive mechanism through intermediate shaft 102, direct clutch 90 and input shaft 32.

Figure 10:
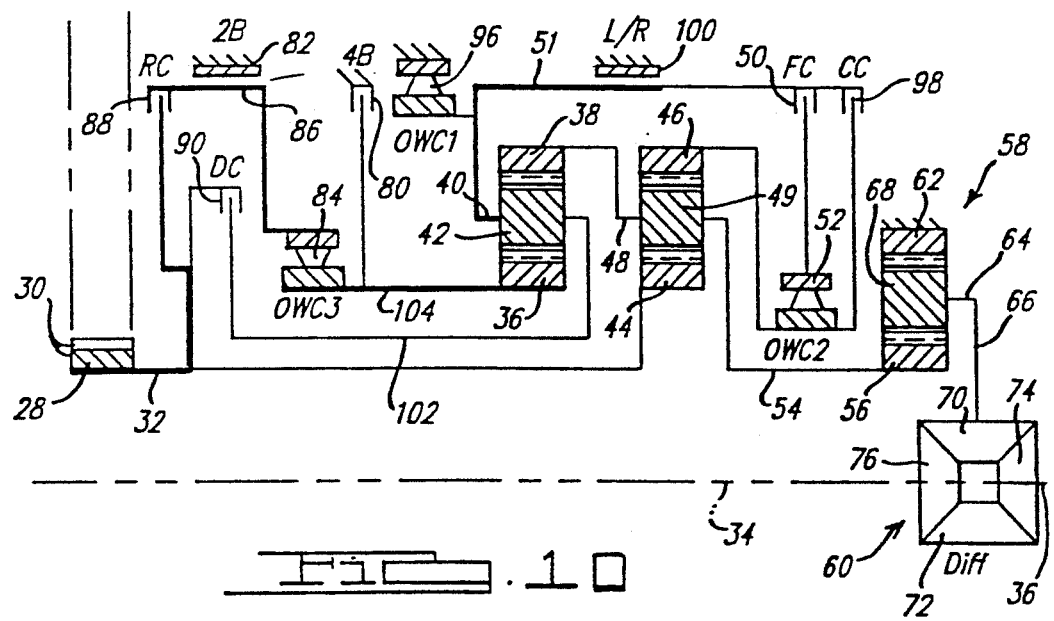

When the transmission is disposed for reverse drive operation, as FIG. 10 shows, input shaft 32 is drivably connected through reverse clutch 88, drum 86, one-way coupling 84 and sleeve shaft 104 to sun gear 36, the input to the first planetary gear unit. Carrier 40 is fixed against rotation through engagement of low/reverse brake band 100. As a result of this engagement, ring gear 38 is driven in the reverse direction and the output is taken on carrier 48 and output shaft 54. During the coast condition in the R-range, coupling 84 overruns, thereby drivably disconnecting sun gear 36 from input shaft 32 and from the engine.

Having described a preferred embodiment of my invention, what I claim and desire to secure by U.S. Letters Patent is:

1. A multiple speed automatic transaxle for an automotive vehicle having a power source for driving a load, comprising:
   input means for carrying torque between the power source and a planetary gear system;
   output means for carrying torque between the planetary gear system and the load;
   a planetary gear system comprising first and second planetary gear units, each gear unit having a sun gear, a ring gear, planet pinions meshing with the sun gear and ring gear, and a carrier rotatably supporting the planet pinions, the carrier of the first gear unit being selectively connectable to the ring gear of the second gear unit, the input means being connected to the sun gear of the second gear unit, the output means being connected to the ring gear of the first gear unit and to the carrier of the second gear unit;
   overdrive brake means (80) for holding against rotation and releasing the sun gear of the first gear unit;
   first clutch means for driveably connecting the ring gear of the second gear unit and the carrier of the first gear unit, comprising a first overrunning coupling (52) and a first friction clutch (50) in series with the first overrunning coupling;
   first overrunning brake means (96) for holding the carrier of the first gear unit against rotation in one rotary direction and releasing said carrier in the opposite rotary direction;
   second clutch means (90) for delivering torque between the input means and the carrier of the first gear unit;
   third clutch means for delivering torque between said input means and the sun gear of said first gear unit, comprising a second overrunning coupling (84) and a third friction clutch (88) in series with the second overrunning coupling;
   first brake means (82) connected to the second overrunning coupling for releasably holding the sun gear of the first gear unit against rotation;
   second brake means (100) for selectively releasably holding the ring gear of the second gear unit and the carrier of the first gear unit against rotation; and
   coast clutch means (98) disposed in parallel with the first clutch means for driveably connecting the ring gear of the second gear unit and the carrier of the first gear unit.

2. The transaxle of claim 1 further comprising:
   a hydrokinetic torque converter having an impeller drivably connected to the power source; and
   a turbine hydrokinetically coupled to the impeller and drivably connected to the input means.

3. The transaxle of claim 1 wherein the output means further comprises final drive gearing drivably connecting the output of the planetary gear system and the load.

4. The transaxle of claim 1 further comprising:
   a hydrokinetic torque converter having an impeller drivably connected to the power source;
   a turbine hydrokinetically coupled to the impeller and drivably connected to the input means; and
   final drive gearing drivably connecting the output of the planetary gear system and the load.

5. The transaxle of claim 2 wherein said transaxle includes a torque transfer drive comprising a drive sprocket connected to said turbine, a driven sprocket connected to said clutch sleeve shaft and a drive chain drivably connecting said drive and driven sprockets.

6. A multiple speed automatic transaxle for an automotive vehicle having a power source for driving a load, comprising:
   input means for carrying torque between the power source and a planetary gear system;
   output means for carrying torque between the planetary gear system and the load;
   a planetary gear system comprising first and second planetary gear units, each gear unit having a sun gear, a ring gear, planet pinions meshing with the sun gear and ring gear, and a carrier rotatably supporting the planet pinions, the carrier of the first gear unit being selectively connectable to the ring gear of the second gear unit, the input means being connected to the sun gear of the second gear unit, the output means being connected to the ring gear of the first gear unit and to the carrier of the second gear unit;
   first means for drivably connecting and releasing the carrier of the first gear unit and the ring gear of the second gear unit, including
   a first drum drivably connected to the carrier of the first gear unit; a first overrunning coupling (52) and a first friction clutch (50) in series with the first overrunning coupling, located between the first drum and the ring gear of the second gear unit; coast clutch means (98) disposed in parallel with the first friction clutch and the first overrunning coupling between the first drum and the ring gear of the second gear unit; overrunning brake means (96) for holding the first drum against rotation in one rotary direction and releasing said drum in the opposite rotary direction; and low/ reverse brake means (100) for selectively releasably holding the first drum against rotation;
   second means for drivably connecting the input means and the sun gear of the first gear unit, including
   a second drum; second overrunning coupling (84) for producing a connection between the second drum and the sun gear of the first gear unit; a third friction clutch (88) releasably connecting the input means and the second drum; and brake means (82) for releasably holding the second drum against rotation; and
   overdrive brake means (80) for holding against rotation and releasing the sun gear of the first gear unit.

7. The transaxle of claim 6 further comprising:

a hydrokinetic torque converter having an impeller drivably connected to the power source; and a turbine hydrokinetically coupled to the impeller and drivably connected to the input means.

8. The transaxle of claim 6 wherein the output means further comprises final drive gearing drivably connecting the output of the planetary gear system and the load.

9. The transaxle of claim 6 further comprising:

a hydrokinetic torque converter having an impeller drivably connected to the power source;

a turbine hydrokinetically coupled to the impeller and drivably connected to the input means; and final drive gearing drivably connecting the output of the planetary gear system and the load.

10. The transaxle of claim 6 wherein said transaxle includes a torque transfer drive comprising a drive sprocket connected to said turbine, a driven sprocket connected to said clutch sleeve shaft and a drive chain drivably connecting said drive and driven sprockets.

11. The transaxle of claim 11 wherein said transaxle includes a torque transfer drive comprising a drive sprocket connected to said turbine, a driven sprocket connected to said clutch sleeve shaft and a drive chain drivably connecting said drive and driven sprockets.

12. A multiple speed automatic transaxle for an automotive vehicle having a power source for driving a load, comprising:

input means for carrying torque between the power source and a planetary gear system;

output means for carrying torque between the planetary gear system and the load;

a planetary gear system comprising first and second planetary gear units, each gear unit having a sun gear, a ring gear, planet pinions meshing with the sun gear and ring gear, and a carrier rotatably supporting the planet pinions, the carrier of the first gear unit being selectively connectable to the ring gear of the second gear unit, the input means being connected to the sun gear of the second gear unit, the output means being connected to the ring gear of the first gear unit and to the carrier of the second gear unit;

first clutch means for driveably connecting the ring gear of the second gear unit and the carrier of the first gear unit, comprising a first overrunning coupling (52) and a first friction clutch (50) in series with the first overrunning coupling;

coast clutch means (98) disposed in parallel with the first clutch means for driveably connecting the ring gear of the second gear unit and the carrier of the first gear unit;

second clutch means for delivering torque between the input means and the carrier of the first gear unit;

third clutch means for delivering torque between said input means and the sun gear of said first gear unit, comprising a second overrunning coupling and a friction clutch in series with the second overrunning coupling; and first brake means connected to the second overrunning coupling for releasably holding the sun gear of the first gear unit against rotation overdrive brake means for holding against rotation and releasing the sun gear of the first gear unit.

* * * * *